Oct. 11, 1927.                                                          1,645,496
C. L. DAUN ET AL
INCLOSED AND VENTILATED ELECTRIC MOTOR
Filed Jan. 20, 1923
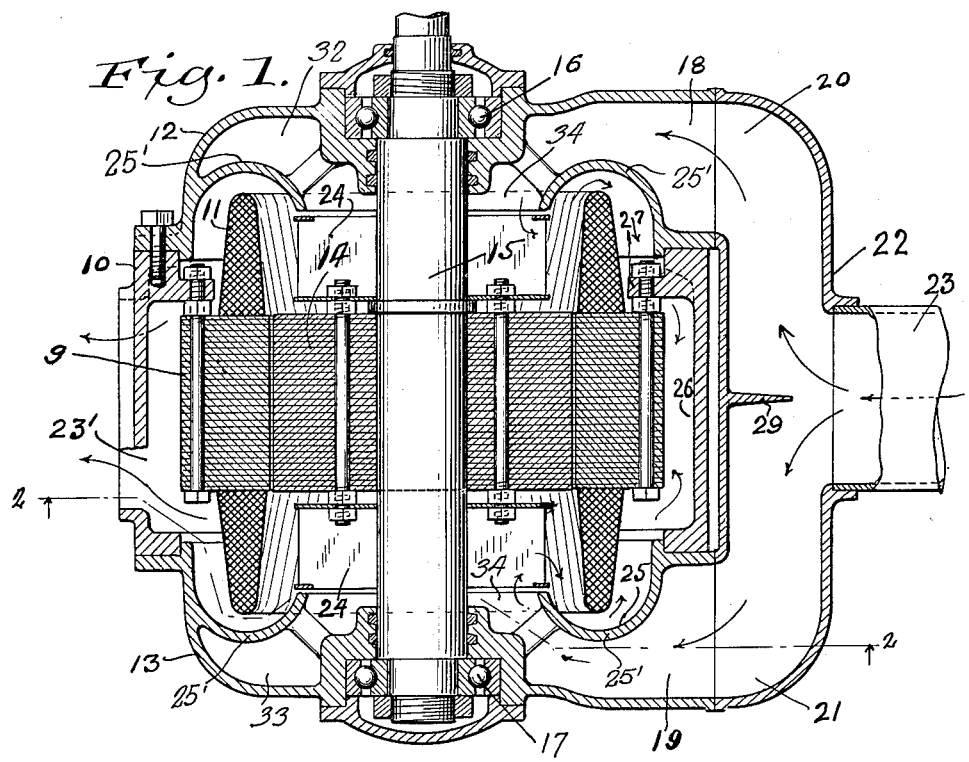
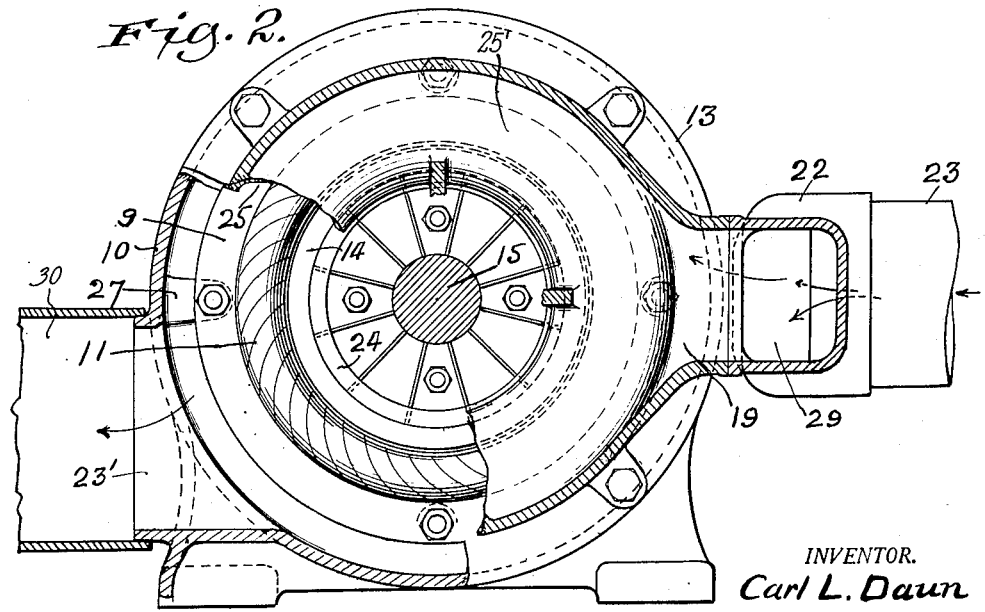
INVENTOR.
Carl L. Daun
and Paul E. Keller
BY
Erwin, Wheeler & Woolard
ATTORNEYS.
WITNESS:
Fred Palm
DEL.

Patented Oct. 11, 1927.

1,645,496

UNITED STATES PATENT OFFICE.

CARL L. DAUN AND PAUL E. KELLER, OF MILWAUKEE, WISCONSIN, ASSIGNORS, BY MESNE ASSIGNMENTS, TO SPLITDORF ELECTRIC COMPANY, OF WISCONSIN, OF MILWAUKEE, WISCONSIN, A CORPORATION OF WISCONSIN.

INCLOSED AND VENTILATED ELECTRIC MOTOR.

Application filed January 20, 1923. Serial No. 613,838.

This invention relates to dynamo electric machines and particularly to ventilating systems therefor. For purposes of explanation the invention will be described as embodied in an induction motor although it may be applied with like advantage to some types of electric generators.

The open type of frame universally employed in the various commercial forms of induction motors is incapable of excluding, from the vital parts of the motor, the dust, smoke, soot, acid fumes or like impurities so commonly contained in the atmosphere of industrial shops. In most instances frequent interruptions of service are necessary in order to rid the motor of accumulated impurities and in some cases, for instance, where the acid fumes are such as to attack the insulated windings, the open type frame renders the motor wholly unfit for use.

Prior attempts made to overcome these well recognized objections to the open type frame have not heretofore proven entirely successful due to the increased difficulty of preventing an excessive rise in temperature within the vital parts of the motor. With the open type frame the problem of proper ventilation is not a simple one, but its seriousness is considerably magnified by attempts to close the frame. Efforts along this line have consisted in the main in wholly inclosing the motor within a dust proof casing, provision being made for effecting a circulation of air within the casing, the heat developed by the motor being transmitted to and through the walls of the casing by contact of the circulating air therewith. Although in some instances a fresh charge of air is admitted to the casing from time to time the ventilation in such motors is so inefficient as to require the use of a greatly oversized motor in order to keep the temperature thereof within safe limits.

One object of the present invention is the provision in a dynamo electric machine, particularly of the induction type, of means for effectively excluding from the vital parts thereof the dust, fumes and other impurities contained in the surrounding atmosphere and at the same time permitting a substantially continuous flow of cooling medium from a selected source in direct contact with those parts. This basically new conception, in order to effectively exclude the immediate atmosphere, involves the use of localized inlet and outlet means for the cooling medium and this renders more difficult the serious problem of distributing the cooling medium over the vital parts of the machine with the uniformity required to insure against excessive heating at localized points. A clearer understanding of this problem and a specific solution thereof will be had from the description hereinafter given.

Another object is the provision of a more efficient ventilating system for dynamo electric machines by which the vital parts may be effectively and uniformly cooled with a minimum power loss. This we have accomplished by a novel arrangement of parts permitting a free flow of air through well defined unobstructed channels so designed as to permit the passage therethrough of large volumes of air at low velocity and pressure and in full contact with the stator windings.

Other more specific objects and advantages will appear from the following description of an illustrative embodiment of the present invention.

In the accompanying drawings:—

Figure 1 is an axial sectional view of an induction motor embodying the present invention.

Fig. 2 is a sectional view taken substantially along the line 2—2 of Figure 1.

The motor selected for illustration includes the usual rotor 14, carried by a shaft 15 for rotation concentrically of and within a stator having a conventional stator core 9 and windings 11. The stator and rotor are wholly inclosed within a dust proof casing which in this instance comprises an intermediate annular frame 10 to which end caps 12 and 13 are removably attached to complete the closure. The rotor shaft 15 is shown journaled in appropriate bearings 16 and 17 provided in the end caps and the stator is supported by a series of lugs 27 projecting inwardly from the frame 10. It will be noted that the frame 10 is spaced from the periphery of the stator core 9 to provide a passage 26 therebetween and that this passage is open at its sides to the end portions of the casing defined by the end caps 12 and 13. The specific means for supporting and accurately centering the stator core 9 within the frame 10 is fully described in our copending application, Serial No. 615,685, filed January 29, 1923, and it will therefore suffice here to state that this means is such as not to materially interfere with an easy flow of air through the passage 26 about the periphery of the stator core.

The end caps 12 and 13 have corresponding inlet openings 18 and 19 at one side of the motor, and to these inlet openings are joined the branches 20 and 21 of a manifold 22, to which is connected the inlet pipe 23, through which pure air from a convenient source may be conveyed into the inclosed motor. In the arrangement shown, the manifold bridges the motor frame, so as to conduct and distribute the incoming air to both ends of the motor. It is obvious that the manifold 22 need not be in the exact form shown, and that its construction may be varied as convenience may dictate, as may be also the relative arrangement of the inlet openings in the end caps 12 and 13. The passage 26 is preferably provided with a single outlet opening 23' to which an appropriate discharge or outlet pipe 30 may be attached. The opening 23' is shown as arranged upon and leading from the opposite side of the motor frame, but this opening may be provided at any convenient point upon the frame. In actual construction of the casing comprised of the frame 10 and the caps 12 and 13, the inlet and outlet openings preferably have approximately the same capacity for affording the movement of the air current, induced by means which will later be described, and that in such construction the assembly of parts be such that air cannot enter the casing while the motor is operating or at any other time except by means of and through the inlet manifold 22. It is preferable that the pipe leading from the outlet opening 23' shall discharge at a distance from the motor. The inlet openings 18 and 19 direct the air into central chambers surrounding the bearings for the rotor shaft. Such chambers are provided with reduced circular outlets facing the rotor at each side, so as to direct the air to the fans.

As thus constructed, the parts constituting the motor are inclosed in a dust-proof casing, and foreign matter of any nature cannot penetrate the same. It follows, therefore, that the motor cannot become clogged even in time, and that moisture or fumes cannot reach the sensitive parts of the motor, although the location of the latter may be most unfavorable, and attendant conditions such as will work serious damage upon an unprotected motor. It will be seen that we have established perfect protection for the insulation with which the motor is provided, and this is an important factor, inasmuch as any deterioration in the quality of the insulation conduces to lessened efficiency upon the part of the motor, and opens the way for burning out under a load. In addition, the possibility of destructive fires caused by sparks from the motor is completely obviated, should combustible material be permitted to accumulate about the motor, or explosive gases permeate its immediate atmosphere.

In the forgoing, we have referred to external conditions which adversely affect an electric motor, and for which we have provided a complete remedy. But inasmuch as in a motor tightly encased as described, the ordinary methods of ventilation for the motor cannot exist, we have provided in connection with the casing, the ventilating means by the use of which a strong current of air is directed about the windings and the stator core to quickly dissipate the heat and prevent any rise in the temperature above that which it may be desired to preserve as normal in motors of this type.

In the motor shown air impelling means in the form of two fans 24 of the radial type are provided for inducing a flow of air into and through the inlet openings 18 and 19, through the ends of the casing to the passage 26, and through the passage 26 to and through the outlet 23' and discharge pipe 30. The fans are preferably arranged to rotate with the shaft 15 and rotor 14 within the projecting annular ends of the stator windings 11. In order to permit a smooth unrestricted passage of the air through the course defined and to insure an equal distribution thereof over the inner and outer surfaces of the stator windings, inwardly directed curved partitions 25' are preferably formed within the end caps 12 and 13. The partitions shown are shaped to receive and to conform to the annular ends of the stator windings and cooperate therewith to define a smooth unbroken path for the air from the fans, around the ends of the windings in direct contact with the inner and outer surfaces thereof, and to the passage 26. These partitions also cooperate with the outer walls of the end caps 12 and 13 to form annular chambers 32 and 33 surrounding the bearings 16 and 17. These chambers are open to the air inlet passages 18 and 19 and are designed to provide constricted throats 34, concentric with the fans 24, through which the air received from the inlet passages is distributed centrally of each fan. This central distribution of air to each fan insures a delivery of air from each fan equally distributed about the periphery thereof. This equal distribution of the air discharged by each fan, together with the easy admission of this air to the air collecting passage 26, and the unrestricted flow of air through this passage to the outlet 23', insures a substantially uniform cooling of the stator windings and effectively prevents an excessive temperature rise at any time or at any point thereof. The positioning of the bearings 16 and 17 within the chambers 32 and 33 insures ample cooling therefor. The manifold 22 is preferably provided with a partition 29, for directing the incoming air to the two fans.

The highly efficient ventilating system which we have devised has enabled us to economize greatly the constructional cost of the motor, and to build a much smaller motor of given H. P. than heretofore. In such construction, the reduced expense of the windings contributes largely to the more economical cost, as do also the other materials involved.

Having thus described our invention what we claim and desire to secure by Letters Patent of the United States, is:

1. In a dynamo electric machine the combination of a rotor, a stator of substantially annular form, a dust excluding casing inclosing said rotor and stator, an air supply conduit connected with said casing, an air discharge conduit connected with said casing, air impelling means for inducing a flow of air through said casing from said supply conduit to said exhaust conduit, and supporting means for said stator formed to permit a substantially uniform distribution of said air over and in contact with the ends of said stator.

2. In a dynamo electric machine the combination of a rotor, a stator of substantially annular form, a dust excluding casing inclosing said rotor and stator and spaced therefrom to provide an air chamber enveloping the ends and periphery of said stator, air admission means open to said chamber, localized air outlet means open to said chamber, air impelling means for inducing a flow of air within said chamber from said admission means to said outlet means and in direct contact with the ends and periphery of said stator, and stator supporting means within said chamber formed to permit a free flow of air therethrough.

3. In a dynamo electric machine the combination of a rotor, a stator of substantially annular form, a dust excluding casing inclosing said rotor and stator and cooperating therewith to form air chambers at the ends thereof, a substantially continuous air passage surrounding said stator and open to each chamber throughout the periphery of said stator, an air discharge conduit connected with said passage, air admission conduits connected with said chambers, and air impelling means for inducing a flow of air from said admission conduit through said chambers and passage to said discharge conduit, said parts cooperating to effect a substantially uniform distribution of said air over the ends of said stator.

4. In a dynamo electric machine the combination of a rotor, a stator of substantially annular form, a dust excluding casing inclosing the same and cooperating therewith to form a continuous open sided air passage surrounding said stator and air chambers at the ends of said stator communicating with said passage, air inlet means for said chambers, a single air outlet means for said passage, and air impelling means for inducing a flow of air from said inlet means through said chambers and passage to said outlet means.

5. In a dynamo electric machine the combination of a rotor, a stator of substantially annular form, a casing inclosing the same and spaced therefrom to provide a single air chamber enveloping the ends and periphery of said stator, localized air inlet and exhaust means for said casing, air impelling means coacting with said casing and stator to induce an air flow from said inlet means through said chamber to said outlet means to thereby envelope said stator within a moving body of air, and means for supporting said stator within said casing without materially hindering said flow to thereby effect a substantially uniform distribution of said air flow over the ends of said stator.

6. In a dynamo electric machine the combination of a rotor, a stator of substantially annular form, a casing inclosing the same, and means for inducing a flow of air through said casing distributed substantially uniformly over the ends of said stator, said means including two radial flow fans disposed at opposite ends of said rotor to rotate with and concentrically thereof, means for directing air to each of said fans concentrically thereof, a substantially continuous annular air passage for collecting the air distributed by both of said fans, and an outlet for said passage.

7. In an electric motor, a stator comprising an annular core and coils forming annular projections extending from the opposite ends of said core, a rotor comprising a shaft and a core substantially filling the bore of said stator core, bearings for said shaft at opposite ends of said rotor, a fan secured to said rotor within each of said coil projections, a frame surrounding and spaced from said stator core to provide an unobstructed annular air passage surrounding said stator core, and annular end walls associated with said frame, said walls cooperating with said bearings to form annular constricted admission passages for said fans surrounding said bearings, and cooperating with said coil projections to form unobstructed annular passages connecting said fans with the opposite sides of said first named passage and closely following the contours of said coil projections.

8. In an electric motor, a stator comprising a core and coils forming annular projections extending from the opposite ends of said core, a rotor comprising a shaft and a core disposed within said stator core, fans associated with opposite sides of said rotor within said coil projections, bearings for said shaft adjacent to said fans, a frame surrounding and spaced from said stator core to provide an unobstructed annular air passage surrounding said stator core and having a discharge opening, annular symmetrical walls connecting said fan with said frame and spaced from said coil projections to form ventilating passages closely following the contours of said coil projections, end caps supporting said bearings and completely inclosing the ends of said motor, and means forming an air supply conduit extending laterally and centrally toward said motor and communicating with the interiors of said caps.

9. In a dynamo electric machine the combination of a rotor, a stator of substantially annular form, a casing surrounding the same and spaced therefrom to form chambers at opposite ends thereof, a fan for discharging air substantially radially of each chamber, and a continuous air passage surrounding said stator and open to said chambers throughout the periphery of said stator for collecting the air discharged from said fans through said chambers.

In testimony whereof, we have signed our names at Milwaukee, this 18th day of January, 1923.

C. L. DAUN.
P. E. KELLER.